United States Patent
Wirth et al.

(10) Patent No.: US 11,841,379 B2
(45) Date of Patent: Dec. 12, 2023

(54) SENSOR ASSEMBLY FOR A VEHICLE

(71) Applicant: Robert Bosch GmbH, Stuttgart (DE)

(72) Inventors: Jens Wirth, Abstatt (DE); Martin Koegel, Bad Berka (DE)

(73) Assignee: Robert Bosch GmbH, Stuttgart (DE)

( * ) Notice: Subject to any disclaimer, the term of this patent is extended or adjusted under 35 U.S.C. 154(b) by 699 days.

(21) Appl. No.: 17/041,933

(22) PCT Filed: Mar. 25, 2019

(86) PCT No.: PCT/EP2019/057396
§ 371 (c)(1),
(2) Date: Nov. 10, 2020

(87) PCT Pub. No.: WO2019/185520
PCT Pub. Date: Oct. 3, 2019

(65) Prior Publication Data
US 2021/0055323 A1 Feb. 25, 2021

(30) Foreign Application Priority Data

Mar. 27, 2018 (DE) ...................... 10 2018 204 615.8

(51) Int. Cl.
*G01P 3/481* (2006.01)
*B60T 8/88* (2006.01)
(Continued)

(52) U.S. Cl.
CPC .............. *G01P 3/481* (2013.01); *B60T 8/885* (2013.01); *G01D 3/08* (2013.01); *G01P 21/02* (2013.01);
(Continued)

(58) Field of Classification Search
CPC .......... G01P 3/481; G01P 21/02; G01P 3/489; B60T 8/885; B60T 2270/402;
(Continued)

(56) References Cited

U.S. PATENT DOCUMENTS

2004/0095021 A1   5/2004   Fogleman et al.
2005/0003565 A1   1/2005   Eisert et al.
(Continued)

FOREIGN PATENT DOCUMENTS

CN   101156046 A   4/2008
CN   101506663 A   8/2009
(Continued)

OTHER PUBLICATIONS

International Search Report corresponding to PCT Application No. PCT/EP2019/057396, dated Oct. 25, 2019 (German and English language document) (13 pages).

*Primary Examiner* — Paresh Patel
(74) *Attorney, Agent, or Firm* — Maginot, Moore & Beck LLP

(57) ABSTRACT

A sensor assembly includes a sensor element and at least two control units, each having an evaluation and control unit and an energy source. In a first control unit, a first evaluation and control unit is connected to a first energy source, and in a second control unit, a second evaluation and control unit is connected to a second energy source. The at least two control units and the sensor element are interconnected by at least one separate interconnection unit. Each interconnection unit connects a first connection of an associated sensor element to the first energy source and/or to the second energy source. A second connection of the sensor element is earthed. A sensor current flowing through the sensor element is modulated at least with information about a detected measured variable. The first evaluation and control unit and/or the second evaluation and control unit evaluate(s) the detected sensor current.

20 Claims, 5 Drawing Sheets

(51) Int. Cl.
*G01D 3/08* (2006.01)
*G01P 21/02* (2006.01)
*G05B 23/02* (2006.01)
*H02J 1/10* (2006.01)
*H02J 9/06* (2006.01)

(52) U.S. Cl.
CPC .............. *G05B 23/02* (2013.01); *H02J 1/102* (2013.01); *H02J 1/108* (2013.01); *H02J 9/06* (2013.01); *B60T 2270/402* (2013.01); *B60T 2270/414* (2013.01)

(58) Field of Classification Search
CPC .... B60T 2270/414; G01D 3/08; G05B 23/02; H02J 1/102; H02J 1/108; H02J 9/06
See application file for complete search history.

(56) References Cited

U.S. PATENT DOCUMENTS

| | | | |
|---|---|---|---|
| 2005/0035656 | A1 | 2/2005 | Kuramochi et al. |
| 2005/0156468 | A1 | 7/2005 | Hentsch et al. |
| 2014/0292313 | A1 | 10/2014 | Ueda et al. |
| 2014/0358320 | A1* | 12/2014 | Hammerschmidt .... G01P 3/488 701/1 |
| 2016/0114779 | A1 | 4/2016 | Binder et al. |
| 2017/0299625 | A1* | 10/2017 | Park ........................ G01P 3/481 |

FOREIGN PATENT DOCUMENTS

| | | |
|---|---|---|
| CN | 101634661 A | 1/2010 |
| CN | 103635348 A | 3/2014 |
| CN | 103733028 A | 4/2014 |
| CN | 204794899 U | 11/2015 |
| CN | 105706193 A | 6/2016 |
| DE | 1 004 189 | 3/1957 |
| DE | 2642464 A1 | 3/1978 |
| DE | 33 19 306 A1 | 11/1984 |
| DE | 19814097 C1 | 3/2000 |
| DE | 100 53 188 A1 | 5/2001 |
| DE | 10041989 A1 | 3/2002 |
| DE | 10135980 C1 | 4/2003 |
| DE | 10152653 A1 | 4/2003 |
| DE | 10 2006 025 902 A1 | 12/2007 |
| DE | 20 2008 010 454 U1 | 11/2008 |
| DE | 10 2009 028 173 A1 | 2/2011 |
| DE | 10 2014 209 438 A1 | 11/2014 |
| DE | 10 2014 208 391 A1 | 11/2015 |
| DE | 10 2014 011 717 A1 | 2/2016 |
| DE | 10 2014 011 719 A1 | 2/2016 |
| DE | 10 2015 202 335 A1 | 8/2016 |
| DE | 10 2015 108 587 A1 | 12/2016 |
| DE | 10 2016 203 974 A1 | 9/2017 |
| DE | 10 2016 222 173 A1 | 5/2018 |
| EP | 0 519 179 A1 | 12/1992 |
| EP | 0 536 557 A1 | 4/1993 |
| FR | 2 655 155 A1 | 5/1991 |
| FR | 2 703 450 | 10/1994 |
| JP | 2005-140642 A | 6/2005 |
| WO | 97/08674 A1 | 3/1997 |
| WO | 02/10689 A1 | 2/2002 |
| WO | 2005/078887 A1 | 8/2005 |
| WO | 2005/093240 A1 | 10/2005 |
| WO | 2007/029720 A1 | 3/2007 |
| WO | 2008/022968 A2 | 2/2008 |
| WO | 2009/037352 A1 | 3/2009 |
| WO | 2013/118515 A1 | 8/2013 |

* cited by examiner

SENSOR ASSEMBLY FOR A VEHICLE

This application is a 35 U.S.C. § 371 National Stage Application of PCT/EP2019/057396, filed on Mar. 25, 2019, which claims the benefit of priority to Serial No. DE 10 2018 204 615.8, filed on Mar. 27, 2018 in Germany, the disclosures of which are incorporated herein by reference in their entirety.

The disclosure is based on a sensor arrangement for a vehicle.

BACKGROUND

Sensor arrangements for vehicles each having a wheel sensor with at least one sensor element for each vehicle wheel are known from the prior art. The individual wheel sensors are generally connected, via a two-core twisted cable, to a control device for a vehicle braking system which carries out, for example, ABS, ESP, ASR and/or hill-hold functions (ABS: anti-lock braking system, ESP: electronic stability program, ASR: anti-slip regulation). A first connection of the at least one sensor element is usually connected to an energy source via the control device (high-side path) and a second connection of the at least one sensor element is connected to ground via the control device (low-side path). A sensor current flowing through the at least one sensor element is modulated with information relating to the speed and/or rotational speed of the corresponding vehicle wheel, wherein an evaluation and control unit of the control device evaluates the sensor current captured between the at least one sensor element and ground.

DE 10 2015 202 335 A1 discloses a sensor housing for a wheel sensor apparatus, a wheel sensor apparatus, a wheel bearing apparatus and a method for forming a sensor system suitable for determining a speed and/or a rotational speed of a wheel of a vehicle. The wheel sensor apparatus comprises a first sensor element which can be used to provide at least one evaluation and/or control apparatus of the vehicle with at least one first sensor variable with respect to a speed and/or a rotational speed of the wheel, and an additional, second sensor element which can be used to provide the at least one evaluation and/or control apparatus with at least one second sensor variable with respect to the speed and/or the rotational speed of the same wheel.

SUMMARY

The sensor arrangement for a vehicle has the advantage that a separate connection module connects the at least two control devices and existing sensor elements to one another. The connection module provides the at least two control devices with sensor signals from connected sensor elements, with the result that evaluation and control units of the at least two control devices can simultaneously evaluate the sensor signals from the connected sensor elements. In addition, the voltage supply of the individual sensor elements can be changed over between two energy sources, with the result that, if a first energy source fails, it is possible to automatically change over to a second energy source. Using only one simple sensor element for each measurement point, the sensor signal from which is redundantly evaluated by two control devices, results in a considerable cost reduction, with approximately the same redundant evaluation reliability, in comparison with the use of two sensor elements for each measurement point, since sensor signals from all measurement points are evaluated in the two control devices and the failure probability of the individual sensor elements is low.

The separate connection module enables a modular structure of such a sensor arrangement for a vehicle. In addition, embodiments of the disclosure make it possible to retain the previous evaluation concepts in the control devices.

Embodiments of the present disclosure provide a sensor arrangement for a vehicle, having a sensor element and at least two control devices each having an evaluation and control unit and an energy source. A first evaluation and control unit is connected to a first energy source in a first control device and a second evaluation and control unit is connected to a second energy source in a second control device. In this case, the at least two control devices and the sensor element are connected to one another via at least one separate connection module, wherein the respective connection module connects a first connection of the associated sensor element to the first energy source and/or to the second energy source. A second connection of the sensor element is connected to ground. A sensor current flowing through the sensor element is modulated with information relating to a captured measurement variable, wherein the first evaluation and control unit and/or the second evaluation and control unit evaluate(s) the captured sensor current. If the connected energy source fails, the connection module respectively connects the first connection of the respective sensor element to the other energy source.

Embodiments of the sensor arrangement according to the disclosure can generally comprise a plurality of sensor elements which are arranged in a distributed manner in the vehicle at a respective measurement point. Embodiments of the present sensor arrangement can therefore preferably be used in a vehicle braking system. In such a braking system, the measurement points may be each assigned to a vehicle wheel, for example, wherein a corresponding sensor element can capture at least a speed and/or rotational speed of the assigned vehicle wheel. It goes without saying that other measurement variables, for example temperature, pressure etc., can also be captured at such a measurement point.

In the present case, the evaluation and control unit can be understood as meaning an electrical circuit which processes or evaluates captured sensor signals. The evaluation and control unit may have at least one interface which may be designed using hardware and/or software. In the case of a hardware design, the interfaces may be, for example, part of a so-called system ASIC which comprises a wide variety of functions of the evaluation and control unit. However, it is also possible for the interfaces to be separate, integrated circuits or to at least partially consist of discrete components. In the case of a software design, the interfaces may be software modules which are present, in addition to other software modules, on a microcontroller, for example. A computer program product having program code, which is stored on a machine-readable carrier such as a semiconductor memory, a hard disk memory or an optical memory and is used to carry out the evaluation when the program is executed by the evaluation and control unit, is also advantageous.

In the present case, the control device can be understood as meaning an electrical device, for example a brake control device, which, in conjunction with a hydraulic braking system, can carry out various braking functions, for example ABS, ESP, ASR and/or hill-hold functions (ABS: anti-lock braking system, ESP: electronic stability program, ASR: anti-slip regulation). In this case, the two control devices can carry out different braking functions during normal operation. If one of the control devices fails, provision may be made for the other control device to assume the braking functions of the failed control device.

In the present case, a sensor element is understood as meaning an electrical component which directly or indirectly captures a physical variable or a change in a physical variable in the region of an assigned vehicle wheel and preferably converts it into an electrical sensor signal. This can be carried out, for example, by emitting and/or receiving sound and/or electromagnetic waves and/or via a magnetic field or the change in a magnetic field. Optical sensor elements having, for example, a photo plate and/or a fluorescent surface and/or a semiconductor, which detect the impingement or the intensity, the wavelength, the frequency, the angle etc. of the received wave, for example infrared sensor elements, are possible. An acoustic sensor element is likewise conceivable, for example an ultrasonic sensor element and/or a high-frequency sensor element and/or a radar sensor element and/or a sensor element which reacts to a magnetic field, for example a Hall sensor element and/or a magnetoresistive sensor element and/or an inductive sensor element which registers the change in a magnetic field via the voltage produced by magnetic induction, for example.

Advantageous improvements of the sensor arrangement for a vehicle are possible by virtue of the measures and developments cited in the dependent claims.

It is particularly advantageous that the changeover apparatus can comprise, at least for each connected sensor element, two diodes with a common node to which a supply voltage for the sensor element connected to the common node can be applied. In this case, a first diode can connect the first energy source in the forward direction to the common node, and a second diode can connect the second energy source in the forward direction to the common node, with the result that a supply voltage which is fed from the first and/or the second energy source can be applied to the common node, wherein the higher voltage prevails. At the expense of a higher voltage drop, this enables a simple and cost-effective implementation of the changeover apparatus which can automatically change over between the voltage sources without an actuation signal.

Alternatively, the changeover apparatus can comprise, at least for each connected sensor element, two switching elements with a common node to which a supply voltage for the sensor element connected to the common node can be applied. In this case, a first actuation unit can actuate a first switching element which connects the common node to the first energy source, and a second actuation unit can actuate a second switching element which connects the common node to the second energy source. In this embodiment, it is possible to stipulate which of the energy sources is preferably used to supply the connected sensor elements. In addition, if field effect transistors are used as switching elements, the voltage drop in the sensor current path can be reduced. For example, the first actuation unit can actuate the first switching element and can connect the common node to the first energy source if a first voltage detection means detects that the first energy source provides a first voltage. In addition, the second actuation unit can actuate the second switching element and can connect the common node to the second energy source if a second voltage detection means detects that the second energy source provides a second voltage and a priority circuit enables the actuation of the second switching element. The priority circuit can enable the actuation of the second switching element if the first voltage detection means detects that the first energy source does not provide a voltage.

In a further advantageous configuration of the sensor arrangement, the first evaluation and control unit can evaluate the respective sensor current captured between the connected energy source and the respective sensor element.

In a further advantageous configuration of the sensor arrangement, a second connection of the respective sensor element in the second control device can be connected to ground. As a result, the second evaluation and control unit can evaluate the respective sensor current captured between the respective sensor element and ground. In addition, a current processing means can be arranged in the respective connection module and can capture the respective sensor current between the connected energy source and the respective sensor element and can make it available to the first evaluation and control unit. Furthermore, the second evaluation and control unit can receive and evaluate the respective sensor current directly as a second measurement current.

Alternatively, the second connection of the respective sensor element in the connection module can be connected to ground. In this embodiment, the first evaluation and control unit and the second evaluation and control unit can evaluate the respective sensor current captured between the connected energy source and the respective sensor element.

In a further advantageous configuration of the sensor arrangement, a current processing means can be arranged in the respective connection module and can capture the sensor current between the connected energy source and the associated sensor element and can make it available to the first evaluation and control unit and/or to the second evaluation and control unit as an associated measurement current. In this case, the respective current processing means can comprise a current sensor which is looped into the current path and can branch off a fraction of the associated sensor current and can forward it to the first evaluation and control unit and/or second evaluation and control unit. As a result, the sensor current which flows into the first connection of the associated sensor element is measured and an equivalent but considerably smaller fraction of the sensor current is forwarded to the first evaluation and control unit and/or the second evaluation and control unit. This makes it possible to reduce the power loss in the connection module.

In a further advantageous configuration of the sensor arrangement, the first evaluation and control unit and/or the second evaluation and control unit can have, at least for each connected sensor element, an input protective circuit which converts the fraction of the respective sensor current into a measurement signal corresponding to the respective sensor current. A voltage representing the respective sensor current can be generated as a measurement signal, for example. In this embodiment, the input protective circuit may comprise, for example, a non-reactive resistor with a higher resistance value which produces a voltage value from the reduced measurement current, said voltage value representing the sensor current. As a result, no changes to the downstream evaluation circuits or downstream evaluation methods are required.

Alternatively, the respective current processing means can comprise, for the connected sensor element, a current conditioning means which is arranged between the associated current sensor and the first evaluation and control unit and/or between the associated current sensor and the second evaluation and control unit and converts the fraction of the sensor current into an associated measurement current corresponding to the associated sensor current. In this embodiment, no changes to the evaluation and control units are required.

In a further advantageous configuration of the sensor arrangement, the current processing means can comprise a first auxiliary voltage generation means with an energy store which outputs, at a summation point, a first auxiliary voltage which is lower than the supply voltages of the energy sources. In addition, the summation point can be connected to the sensor current paths of the connected sensor elements between the respective changeover apparatus and the respective current sensor in order to charge the energy store. The first auxiliary voltage may be approximately 1 V lower than the supply voltages of the energy sources, for example. The summation point can be respectively connected to the sensor current paths of the connected sensor elements via a feedback protective diode and a current source, for example. Furthermore, the current processing means can comprise a second auxiliary voltage generation means which may be in the form of a DC/DC converter and can convert the first auxiliary voltage into a considerably lower, second auxiliary voltage. This second auxiliary voltage can preferably supply the current conditioning means. As a result, the current conditioning means acts as a loadable energy source which is fed by means of the second auxiliary voltage source. In order to keep the power loss low overall, this auxiliary voltage source has a voltage of approximately 2.5 V to 3 V. The energy of the first auxiliary voltage source is advantageously produced from the supply voltage from the first or second energy source which is applied to the first input of the connected sensor elements.

In a further advantageous configuration of the sensor arrangement, the current processing means can comprise an emergency voltage generation means which, if the supply voltage is missing, can supply a connected sensor element with a third auxiliary voltage which is generated from the sensor current paths of the other connected sensor elements. The emergency voltage generation means is effective when both supply voltages fail in a sensor element. The emergency voltage generation means can comprise, for example, a DC/DC converter which converts the second auxiliary voltage of approximately 2.5 V to 3 V into the higher, third auxiliary voltage of approximately 8 V, a switching apparatus and a feedback protective diode, wherein the switching apparatus connects the third auxiliary voltage to the affected sensor current path.

In a further advantageous configuration of the sensor arrangement, the individual sensor elements can be respectively connected to the connection module via a two-wire line. In addition, the at least two control devices can be respectively connected to the individual connection modules via a two-wire line.

In a further advantageous configuration of the sensor arrangement, the individual connection modules can each be in the form of an ASIC module. Furthermore, the individual connection modules can each be arranged in a connector and/or a housing of the associated sensor element.

Exemplary embodiments of the disclosure are illustrated in the drawing and are explained in more detail in the following description. In the drawing, identical reference signs denote components or elements which perform identical or similar functions.

DETAILED DESCRIPTION

Figure 1:
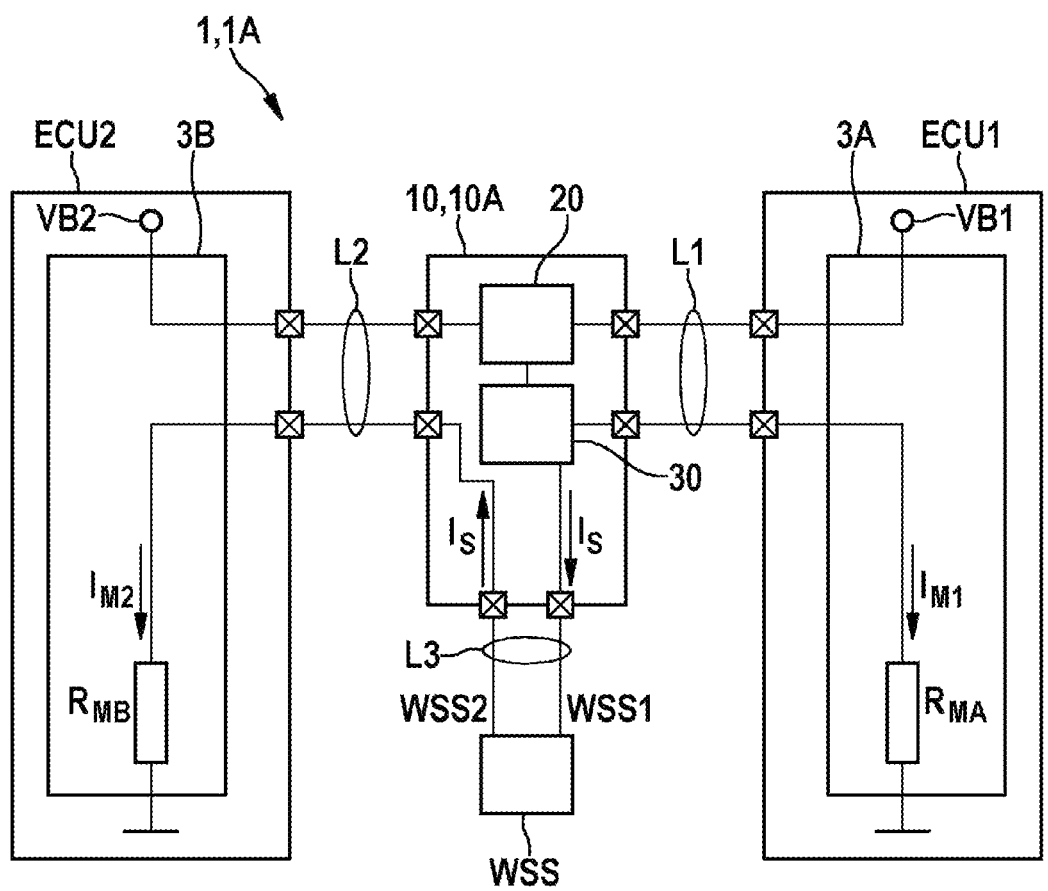
FIG. 1 shows a schematic block diagram of a first exemplary embodiment of a sensor arrangement according to the disclosure for a vehicle.
Figure 2:
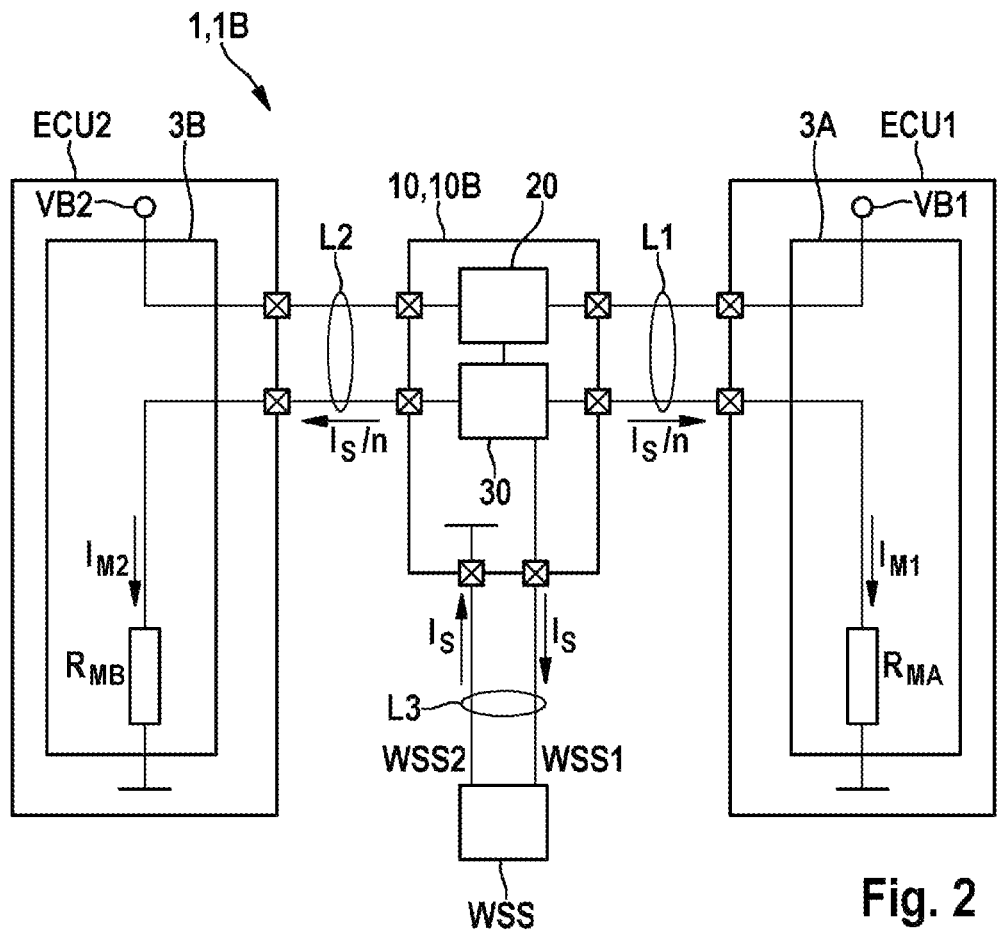
FIG. 2 shows a schematic block diagram of a second exemplary embodiment of a sensor arrangement according to the disclosure for a vehicle.

As is clear from FIGS. 1 and 2, the illustrated exemplary embodiments of a sensor arrangement 1, 1A, 1B according to the disclosure for a vehicle each comprise a sensor element WSS and at least two control devices ECU1, ECU2 each having an evaluation and control unit 3A, 3B and an energy source VB1, VB2. As is also clear from FIGS. 1 and 2, a first evaluation and control unit 3A is connected to a first energy source VB1 in a first control device ECU1. A second evaluation and control unit 3B is connected to a second energy source VB2 in a second control device ECU2. In this case, the at least two control devices ECU1, ECU2 and the sensor element WSS are connected to one another via at least one separate connection module 10. The respective connection module 10 connects a first connection WSS1 of the associated sensor element WSS to the first energy source VB1 and/or to the second energy source VB2. A second connection WSS2 of the sensor element WSS is connected to ground. In addition, a sensor current $I_s$ flowing through the sensor element WSS is modulated with information relating to a captured measurement variable, wherein the first evaluation and control unit 3A and/or the second evaluation and control unit 3B evaluate(s) the captured sensor current $I_s$. If the connected energy source VB1, VB2 fails, the connection module 10 respectively connects the first connection WSS1 of the respective sensor element WSS to the other energy source VB2, VB1. This means that, if the connected first energy source VB1 fails, the connection module 10 changes over to the second energy source VB2 and, if the connected second energy source VB2 fails, changes over to the first energy source VB1.

Embodiments of the sensor arrangement 1, 1A, 1B according to the disclosure for a vehicle generally comprise a plurality of measurement points each with such a sensor element WSS. For reasons of clarity, only one of the sensor elements WSS is respectively illustrated in FIGS. 1 and 2. Embodiments of the present sensor arrangement 1, 1A, 1B are thus preferably used in a vehicle braking system. In such a braking system, the measurement points can each be assigned to a vehicle wheel, for example, wherein the sensor elements WSS can capture at least a speed and/or rotational speed of the corresponding vehicle wheel. In a normal automobile having four wheels, the sensor arrangement 1, 1A, 1B therefore has four sensor elements WSS of this type.

It goes without saying that other measurement variables, for example temperature, pressure etc., can be captured at such a measurement point.

In this case, the second connections WSS2 of the sensor elements WSS can be connected to ground directly or via interposed components.

As is also clear from FIGS. 1 and 2, the connection module 10 in the illustrated exemplary embodiments respectively comprises a changeover apparatus 20 and a current processing means 30. Exemplary embodiments of the changeover apparatus are described below with reference to FIGS. 3 and 4 and exemplary embodiments of the current processing means 30 are described with reference to FIGS. 5 to 7.

The first evaluation and control unit 3A can evaluate the respective sensor current $I_s$ captured between the connected energy source VB1, VB2 and the respective sensor element WSS. For this purpose, a signal processing means 30 is arranged in the respective connection modules 10 and captures the respective sensor current $I_s$ between the connected energy source VB1, VB2 and the respective sensor element WSS and makes it available to the first evaluation and control unit 3A. This means that the first evaluation and control unit 3A evaluates the sensor current $I_s$ in the high-side path.

As is also clear from FIG. 1, the second connection WSS2 of the respective sensor element WSS is connected to ground via a measuring resistor $R_{MB}$ in the second control device ECU2 in the illustrated first exemplary embodiment of the sensor arrangement 1A for a vehicle, wherein the second evaluation and control unit 3B receives and evaluates the respective sensor current $I_s$ captured between the respective sensor element WSS and ground directly as a second measurement current $I_{M1}$. This means that the second evaluation and control unit 3B evaluates the sensor current $I_s$ captured in the low-side path.

As is also clear from FIG. 2, the second connection WSS2 of the respective sensor element WSS is connected to ground in the connection module 10B in the illustrated second exemplary embodiment of the sensor arrangement 1B for a vehicle, wherein the second evaluation and control unit 3B evaluates the respective sensor current $I_s$ captured between the connected energy source VB1, VB2 and the respective sensor element WSS. This means that the second evaluation and control unit 3B also evaluates the sensor current $I_s$ captured in the high-side path. As is also clear from FIG. 2, the sensor processing means 30 arranged in the respective connection module 10B captures the respective sensor current $I_s$ between the connected energy source VB1, VB2 and the respective sensor element WSS and makes it available to the first evaluation and control unit 3A and to the second evaluation and control unit 3B as an associated measurement current $I_{M1}$, $I_{M2}$ in the illustrated second exemplary embodiment.

Figure 3:
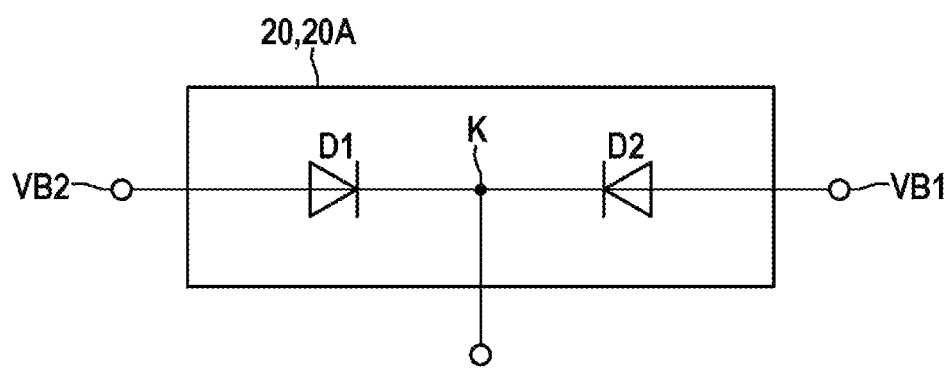
FIG. 3 shows a schematic block diagram of a first exemplary embodiment of a changeover apparatus of the sensor arrangement according to the disclosure for a vehicle from FIG. 1 or 2.

As is clear from FIG. 3, the changeover apparatus 20A in the illustrated first exemplary embodiment comprises two diodes D1, D2 with a common node K to which a supply voltage for the sensor element WSS connected to the common node K is applied. In this case, a first diode D1 connects the first energy source VB1 in the forward direction to the common node K. A second diode D2 connects the second energy source VB2 in the forward direction to the common node K. As a result, a supply voltage which is fed from the first and/or the second energy source VB1, VB2 is applied to the common node K, wherein the higher voltage prevails. This means that, if the first energy source VB1 fails, the node K is fed from the second energy source VB2 and vice versa. If both channels are completely symmetrical, the node K is fed by both energy sources VB1, VB2 in equal parts.

Figure 4:
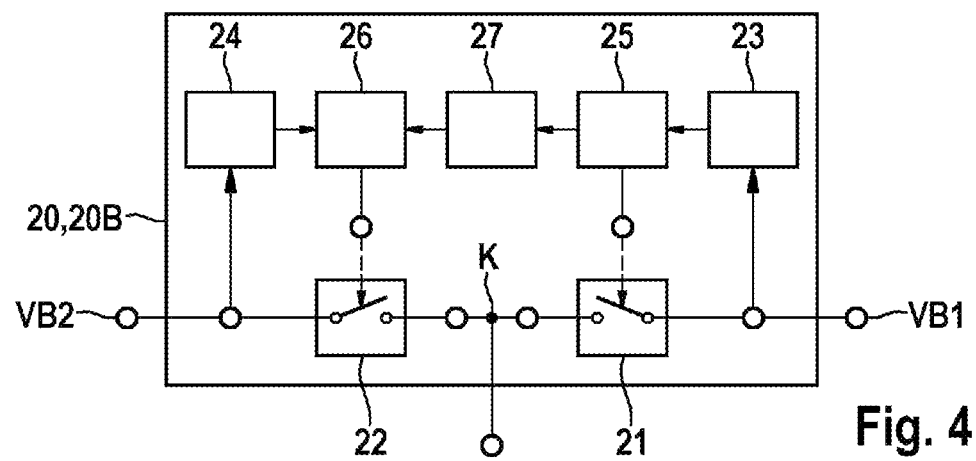
FIG. 4 shows a schematic block diagram of a second exemplary embodiment of the changeover apparatus of the sensor arrangement according to the disclosure for a vehicle from FIG. 1 or 2.

As is also clear from FIG. 4, the changeover apparatus 20B in the illustrated second exemplary embodiment comprises two switching elements 21, 22, which are preferably in the form of field effect transistors, with a common node K to which a supply voltage for the sensor element WSS connected to the common node K is applied. As is also clear from FIG. 4, a first actuation unit 25 actuates a first switching element 21 which connects the common node K to the first energy source VB1. A second actuation unit 26 actuates a second switching element 22 which connects the common node K to the second energy source VB2. As is also clear from FIG. 4, a first voltage detection means 23 detects whether the first energy source VB1 provides a first voltage. A second voltage detection means 24 detects whether the second energy source VB2 provides a second voltage. In addition, the changeover apparatus 20B comprises a priority circuit 27 which, in the illustrated second exemplary embodiment, gives priority to the first energy source VB1 over the second energy source. In an alternative exemplary embodiment which is not illustrated, the priority circuit 27 can give priority to the second energy source VB2 over the first energy source VB1. The first actuation unit 25 actuates the first switching element 21 and connects the common node K to the first energy source VB1 if the first voltage detection means 23 detects that the first energy source VB1 provides the first voltage. The second actuation unit 26 actuates the second switching element and connects the common node K to the second energy source VB2 if the second voltage detection means 24 detects that the second energy source VB2 provides the second voltage and the priority circuit 27 enables the actuation of the second switching element 22. In the illustrated second exemplary embodiment, the priority circuit 27 enables the actuation of the second switching element 22 if the first voltage detection means 23 detects that the first energy source VB1 does not provide a voltage. As a result of the priority circuit 27, the second energy source VB2 can be connected more quickly to the common node K since the priority circuit 27 switches through only an actuation signal generated by the second actuation circuit 26 to the second switching element 22.

Various exemplary embodiments of the current processing means 30 for the first exemplary embodiment of the sensor arrangement 1A for a vehicle from FIG. 1 are described below with reference to FIGS. 5 to 7. As is clear from FIGS. 5 to 7, the current processing means 30 comprises a current sensor 32 which is looped into the current path and branches off a fraction $I_s/n$ of the sensor current $I_s$ and forwards it to the first evaluation and control unit 3A. In addition, the current sensor 32 passes the sensor current $I_s$ to the first connection WSS1 of the associated sensor element WSS.

Figure 5:
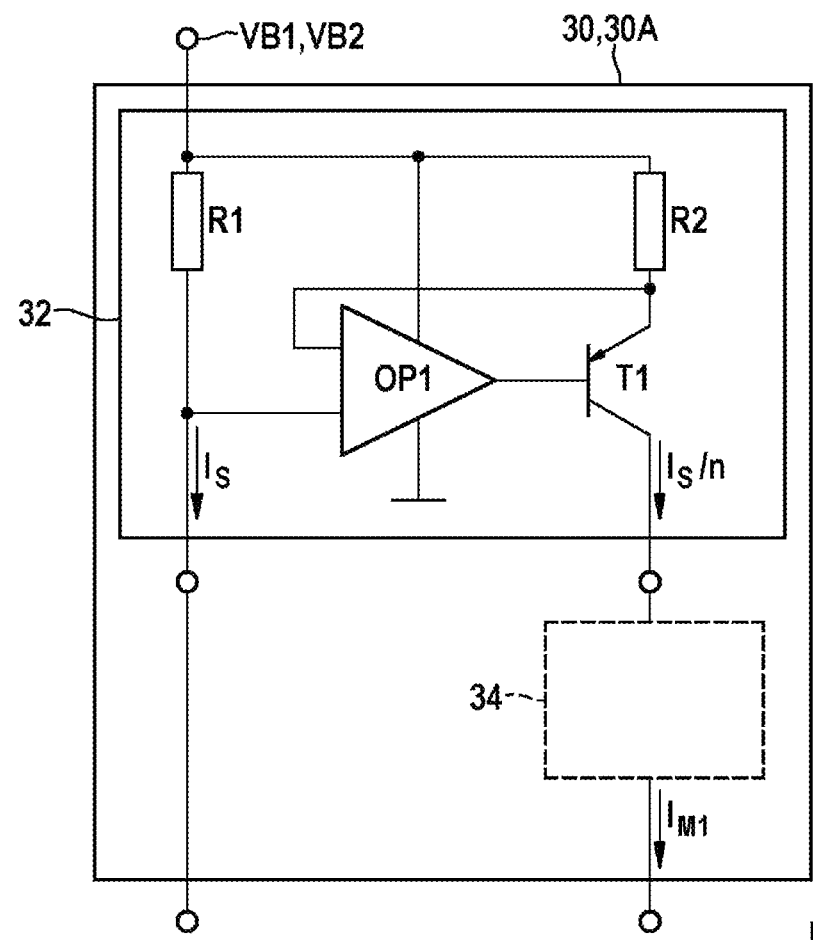
FIG. 5 shows a schematic block diagram of a first exemplary embodiment of a current processing means of the sensor arrangement according to the disclosure for a vehicle from FIG. 1.

As is also clear from FIG. 5, the current sensor 32 in the illustrated exemplary embodiment comprises two non-reactive resistors R1, R2, an operational amplifier OP1 and a transistor T1. Said electrical components are connected to one another as illustrated, with the result that the current sensor 32 in the high-side path of the first control device ECU1 causes a low voltage drop in contrast to a simple current mirror circuit. The sensor current $I_s$ which flows into the first connection WSS1 of the sensor element WSS is measured by the current sensor 32 and an equivalent, but considerably smaller current $I_s/n$ is supplied to the first evaluation and control unit 3A in order to reduce the power loss in the first control device ECU1. When branching off the additional fraction $I_s/n$ of the sensor current $I_s$, it should be noted that the energy sources VB1, VB2 are able to provide this additional fraction $I_s/n$ of the sensor current $I_s$. An overall current $(I_s/n+I_s)$ which is drawn from the connected energy source VB1, VB2 should not exceed a predefined maximum value of 50 mA, for example. In the case of a v protocol, the sensor current $I_s$ has values of mA/14 mA/28 mA. These values can be considerably reduced by means of the current sensor 32. A value of 50, for example, can be selected for n. In order to generate the corresponding measurement signals for the v protocol for the evaluation in the first evaluation and control unit 3A, an input protective circuit having the first evaluation and control unit 3A at least for each connected sensor element WSS can be accordingly adapted in order to convert the fraction $I_s/n$ of the respective sensor current $I_s$ into a measurement signal corresponding to the respective sensor current $I_s$. For example, a first measurement resistance $R_{MA}$ of approximately 10 ohms can be increased by the factor n, which corresponds here to the value 50, to approximately 500 ohms in order to be able to directly process the fraction $I_s/n$ of the respective sensor current $I_s$ from the current sensor 32. As a result, the overall effort needed to adapt the first control device ECU1 can be considerably reduced since a downstream current conditioning means 34 for providing the first measurement current $I_{M1}$, which is illustrated only with dashed lines in FIG. 5, could be dispensed with.

Figure 6:
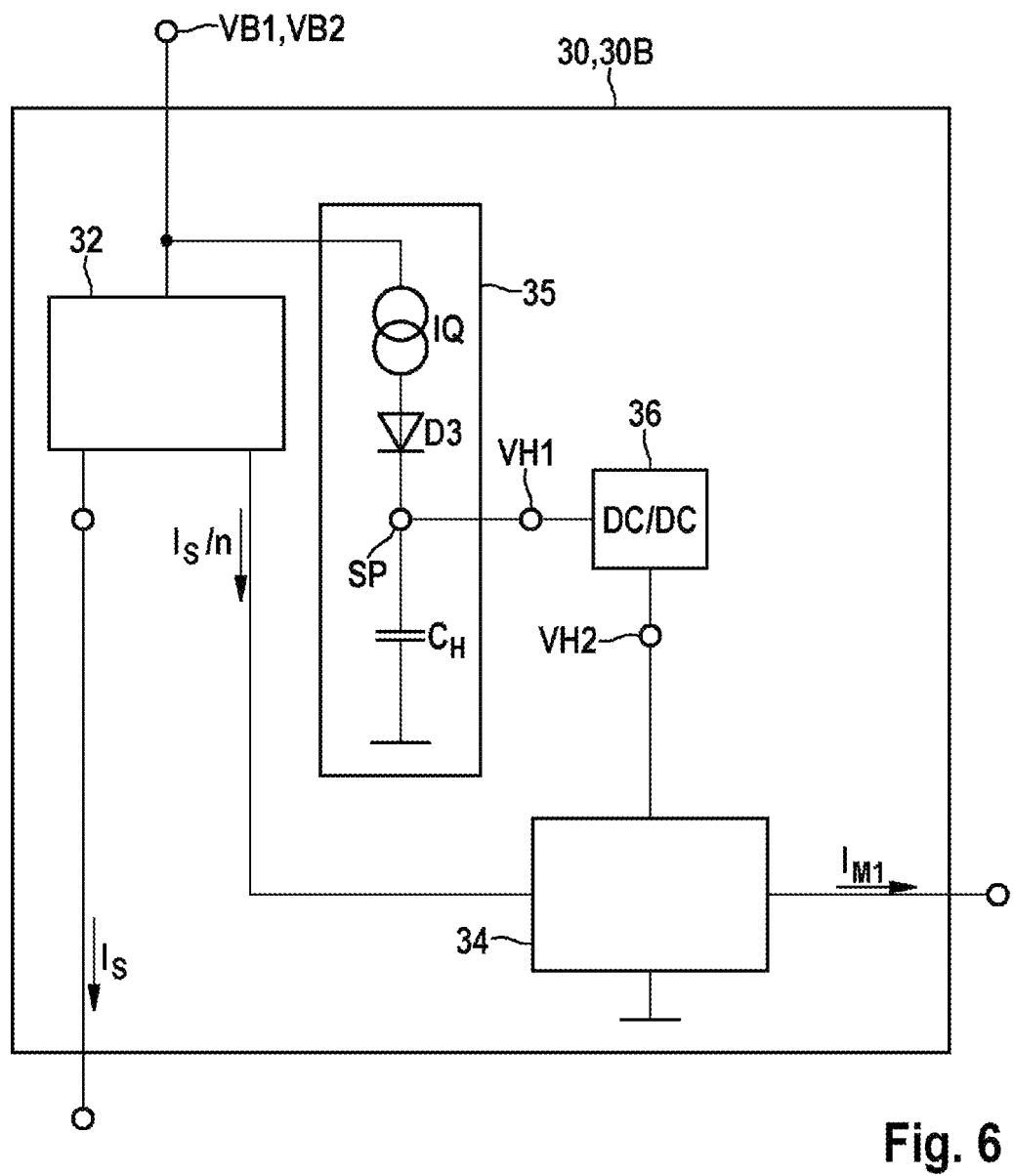
FIG. 6 shows a schematic block diagram of a second exemplary embodiment of the current processing means of the sensor arrangement according to the disclosure for a vehicle from FIG. 1.
Figure 7:
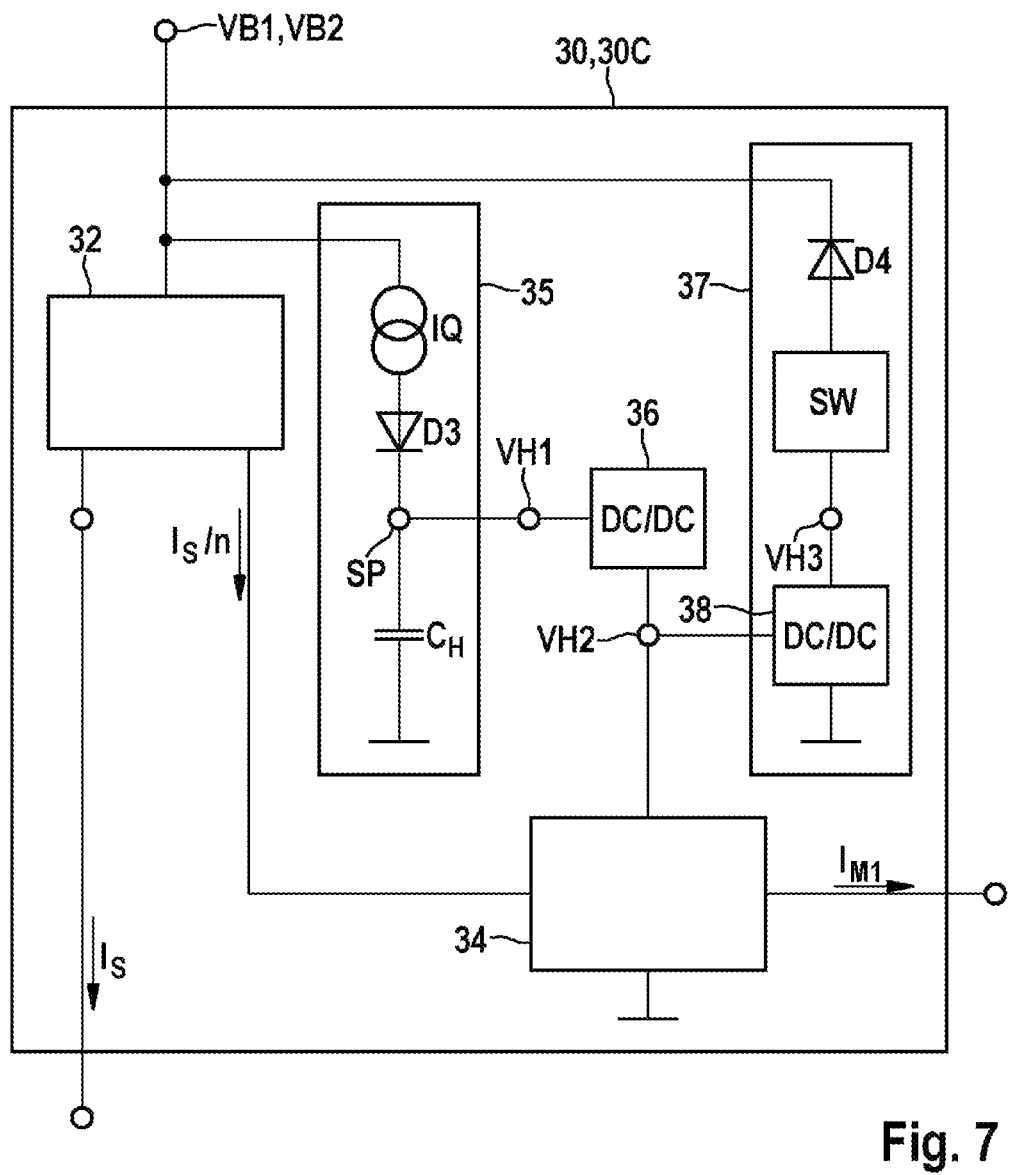
FIG. 7 shows a schematic block diagram of a third exemplary embodiment of the current processing means of the sensor arrangement according to the disclosure for a vehicle from FIG. 1.

As is clear from FIGS. 6 and 7, the current processing means 30 in the illustrated exemplary embodiments comprises a current conditioning means 34 which is arranged between the current sensor 32 and the first evaluation and control unit 3A. The current conditioning means 34 is in the form of a loadable energy source and converts the fraction $I_s/n$ of the respective sensor current $I_s$ into an associated first measurement current $I_{M1}$ corresponding to the respective sensor current $I_s$. As is also clear from FIGS. 6 and 7, the current processing means 30 comprises a first auxiliary voltage generation means 35 having an energy store $C_H$ which outputs a first auxiliary voltage VH1 at a summation point SP. The first auxiliary voltage VH1 is approximately 1 V lower than the supply voltages of the energy sources VB1, VB2 which each have a value of approximately 12 V, for example. The summation point SP is connected to the sensor current paths of the connected sensor elements WSS between the respective changeover apparatus 20 and the respective current sensor 32 in order to charge the energy store $C_H$. In the illustrated exemplary embodiments, the summation point SP is respectively connected to the sensor current paths of the connected sensor elements WSS via a feedback protective diode D3 and a current source IQ. In addition, the current processing means 30 comprises a second auxiliary voltage generation means 36 which is in the form of a DC/DC converter and converts the first auxiliary voltage VH1 into a considerably lower, second auxiliary voltage VH2 of 2.5 V to 3 V, for example, in order to keep the power loss low overall. The second auxiliary voltage generation means 36 supplies the current conditioning means 34 with the second auxiliary voltage VH2.

As is also clear from FIG. 7, the current processing means 30 in the illustrated exemplary embodiment comprises an emergency voltage generation means 37 which, if the supply voltage is missing, supplies a connected sensor element WSS with a third auxiliary voltage VH3 of approximately 8 V which is generated from the sensor current paths of the other connected sensor elements WSS. The emergency voltage generation means 37 comprises in the illustrated exemplary embodiment a DC/DC converter 38 which converts the second auxiliary voltage VH2 into the higher, third auxiliary voltage VH3, a switching apparatus SW and a feedback protective diode D4. The switching apparatus SW connects the third auxiliary voltage VH3 to the affected sensor current path, with the result that the third auxiliary voltage VH3 supplies the associated sensor element WSS.

For the second exemplary embodiment of the sensor arrangement 1B, as illustrated in FIG. 2, the corresponding current processing means 30 (not illustrated) comprises two current sensors 32 of this type which are looped into the current path, wherein the resistor R1 is used by both current sensors 32. The current sensors 32 each branch off a fraction $I_s/n$ of the sensor current $I_s$. When branching off the two additional fractions $I_s/n$ of the sensor current $I_s$, it should be noted that the energy sources VB1, VB2 are able to provide these additional fractions $I_s/n$ of the sensor current $I_s$. An overall current $(2(I_s/n)+I_s)$ which is drawn from the connected energy source VB1, VB2 should not exceed a predefined maximum value of 50 mA, for example. In this case, a first current sensor 32 forwards the fraction $I_s/n$ of the sensor current $I_s$ which has been branched off to the first evaluation and control unit 3A, and a second current sensor 32 forwards the fraction $I_s/n$ of the sensor current $I_s$ which has been branched off to the second evaluation and control unit 3B. The provision of the second measurement current $I_{M2}$ for the second evaluation and control unit 3B of the second control device ECU2 is effected in a similar manner to the provision of the first measurement current $I_{M1}$ for the first evaluation and control unit 3A of the first control device ECU1.

The connection module 10 is preferably in the form of an ASIC module. In this case, the individual connection modules 10 can each be arranged in a connector and/or a housing of the associated sensor element WSS.

Alternatively, the connection modules 10 can also be installed in the vehicle at other suitable installation locations.

As is also clear from FIGS. 1 and 2, the individual sensor elements WSS and the at least two control devices ECU1, ECU2 in the illustrated exemplary embodiments are respectively connected to the associated connection module 10 via a two-wire line L1, L2, L3. This results in simplified cabling complexity.

Embodiments of the present disclosure provide a sensor arrangement for a vehicle, in which a simple sensor element known from the prior art is simultaneously used by two control devices. The control devices may have unchanged or only slightly adapted evaluation and control units known from the prior art.

The invention claimed is:
1. A sensor arrangement comprising:
   a sensor element;
   at least a first control device and a second control device each having an evaluation and control unit and an energy source, wherein a first evaluation and control unit of the first control device is connected to a first energy source in the first control device, and a second evaluation and control unit of the second control device is connected to a second energy source in the second control device; and
   at least one separate connection module configured to connect the first and the second control devices and the sensor element to one another,
   wherein a respective connection module of the at least one separate connection module connects a first connection of the sensor element to the first energy source and/or to the second energy source, wherein a second connection of the sensor element is connected to ground, wherein the sensor element is configured to modulate a sensor current flowing through the sensor element with information relating to a captured measurement variable as a captured sensor current, and wherein the first evaluation and control unit and/or the second evaluation and control unit is configured to evaluate the captured sensor current, and when a connected energy source of the first and the second energy sources fails, the respective connection module is configured to connect the first connection of the sensor element to another energy source of the first and the second energy sources.

2. The sensor arrangement as claimed in claim 1, further comprising:

a plurality of the sensor elements respectively arranged at a measurement point of a plurality of measurement points.

3. The sensor arrangement as claimed in claim 2, wherein:

the measurement points of the plurality of measurement points are each assigned to a corresponding vehicle wheel, and an associated sensor element of the plurality of sensor elements captures at least a speed and/or rotational speed of the corresponding vehicle wheel.

4. The sensor arrangement as claimed in claim 2, wherein the first evaluation and control unit evaluates a respective captured sensor current captured between the connected energy source and a respective sensor element of the plurality of sensor elements.

5. The sensor arrangement as claimed in claim 1, wherein:

the respective connection module has a changeover apparatus comprising two diodes with a common node to which a supply voltage for the sensor element connected to the common node is applied, and a first diode of the two diodes connects the first energy source in a forward direction to the common node, and a second diode of the two diodes connects the second energy source in the forward direction to the common node, such that the supply voltage fed from the first and/or the second energy source is applied to the common node, and a higher voltage prevails.

6. The sensor arrangement as claimed in claim 1, wherein:

the respective connection module has a changeover apparatus comprising two switching elements with a common node to which a supply voltage for the sensor element connected to the common node is applied, a first actuation unit is configured to actuate a first switching element of the two switching elements, which connects the common node to the first energy source, and a second actuation unit is configured to actuate a second switching element of the two switching elements, which connects the common node to the second energy source.

7. The sensor arrangement as claimed in claim 6, wherein:

the first actuation unit is configured to actuate the first switching element and to connect the common node to the first energy source when if a first voltage detection unit detects that the first energy source provides a first voltage, the second actuation unit is configured to actuate the second switching element and to connect the common node to the second energy source when if a second voltage detection unit detects that the second energy source provides a second voltage, a priority circuit is configured to enable the actuation of the second switching element, and the priority circuit enables the actuation of the second switching element when the first voltage detection unit detects that the first energy source does not provide the first voltage.

8. The sensor arrangement as claimed in claim 6, wherein:

the second connection of the sensor element in the second control device is connected to ground, and the second evaluation and control unit evaluates the captured sensor current captured between the sensor element and ground.

9. The sensor arrangement as claimed in claim 8, further comprising:

a current processing unit arranged in the respective connection module and configured to capture the captured sensor current between the connected energy source and the sensor element and to make the captured sensor current available to the first evaluation and control unit.

10. The sensor arrangement as claimed in claim 9, wherein the second evaluation and control unit is configured to receive and to evaluate the captured sensor current directly as a measurement current.

11. The sensor arrangement as claimed in claim 9, wherein the current processing unit comprises a current sensor which is looped into a current path and branches off a current fraction of the captured sensor current and forwards the current fraction to the first evaluation and control unit and/or second evaluation and control unit.

12. The sensor arrangement as claimed in claim 11, wherein the first evaluation and control unit and/or the second evaluation and control unit has/have, at least for each connected sensor element, an input protective circuit configured to convert the current fraction of a respective captured sensor current into an associated measurement signal corresponding to the respective captured sensor current.

13. The sensor arrangement as claimed in claim 11, wherein the current processing unit comprises a current conditioning unit arranged between the current sensor and the first evaluation and control unit and/or between the current sensor and the second evaluation and control unit and configured to convert the current fraction of the captured sensor current into an associated measurement current corresponding to the captured sensor current.

14. The sensor arrangement as claimed in claim 13, wherein:

the current processing unit comprises a first auxiliary voltage generation unit with an energy store configured to output, at a summation point, a first auxiliary voltage which is lower than the supply voltages of the first and the second energy sources, the summation point is connected to the sensor current paths of the connected sensor elements between the changeover apparatus and the current sensor in order to charge the energy store, the summation point is respectively connected to the sensor current paths of the connected sensor elements via a feedback protective diode and a current source, the current processing unit comprises a second auxiliary voltage generation unit including a DC/DC converter configured to convert the first auxiliary voltage into the considerably lower second auxiliary voltage, and the second auxiliary voltage supplies the current conditioning unit.

15. The sensor arrangement as claimed in claim 14, wherein:

the current processing unit comprises an emergency voltage generation unit which, when the supply voltage is missing, supplies the connected sensor element with a third auxiliary voltage which is generated from the sensor current paths of the other connected sensor elements, the emergency voltage generation unit comprises a further DC/DC converter configured to convert the second auxiliary voltage into the higher, third auxiliary voltage, a switching apparatus, and a further feedback protective diode, the switching apparatus is configured to connect the third auxiliary voltage to an affected sensor current path, and the sensor elements are respectively connected to the connection module via a two-wire line.

16. The sensor arrangement as claimed in claim 1, wherein:

the second connection of the sensor element in the respective connection module is connected to ground, and the second evaluation and control unit evaluates the captured sensor current captured between the connected energy source and the sensor element.

17. The sensor arrangement as claimed in claim 16, further comprising:

a current processing unit arranged in the respective connection module and configured to capture the captured sensor current between the connected energy source and the sensor element and to make the captured sensor current available to the first evaluation and control unit and/or to the second evaluation and control unit as a measurement current.

18. The sensor arrangement as claimed in claim 1, wherein the first and the second control devices are respectively connected to the individual connection modules via a two-wire line.

19. The sensor arrangement as claimed in claim 18, wherein the individual connection modules are each configured as an ASIC module.

20. The sensor arrangement as claimed in claim 18, wherein the individual connection modules are each arranged in a connector and/or a housing of the sensor element.

* * * * *

UNITED STATES PATENT AND TRADEMARK OFFICE
CERTIFICATE OF CORRECTION

PATENT NO. : 11,841,379 B2
APPLICATION NO. : 17/041933
DATED : December 12, 2023
INVENTOR(S) : Wirth et al.

It is certified that error appears in the above-identified patent and that said Letters Patent is hereby corrected as shown below:

In the Claims

In Claim 7, at Column 11, Lines 65-66: "when if a second voltage" should read --when a second voltage--.

Signed and Sealed this
Seventh Day of May, 2024

Katherine Kelly Vidal
*Director of the United States Patent and Trademark Office*